Patented Aug. 1, 1950

2,516,988

UNITED STATES PATENT OFFICE 2,516,988

METHOD OF PRODUCING PURIFIED BRINE

David W. Hengerer, Norwalk, Conn., assignor to International Salt Company, New York, N. Y., a corporation of New Jersey No Drawing. Application March 10, 1948, Serial No. 14,163

10 Claims. (Cl. 23—89)

This invention relates to an improved method for producing purified sodium chloride brine, and particularly for producing sodium chloride brine having a low calcium, magnesium and sulfate impurity content.

The invention provides a simplified continuous method for producing high-purity brine, which method may be carried out entirely in a single salt-dissolving and purifying apparatus.

The invention also provides a method for producing high-purity brine by means of chemical precipitating reagents, which method utilizes an appreciably smaller excess of one of the precipitating reagents and yet requires no more of the other precipitating reagent than normally required in previous purification procedures employing such reagents.

The invention renders possible the production of brines of high purity which are especially suitable for use in various industrial processes such as in canning processes and dye manufacturing. These and other novel features and advantages of the invention will become apparent from the following description:

Heretofore when brine of low impurity content has been required the brine has been produced either by dissolving the highest grade of purified sodium chloride in distilled water, or by dissolving any grade of sodium chloride, such as rock salt, in available water and thereafter treating the resulting brine by a sequence of auxiliary purifying processes. Such an auxiliary purification process may involve the addition of precipitating reagents such as soda ash ($Na_2CO_3$), caustic soda (NaOH) and/or barium carbonate ($BaCO_3$) to a saturated brine solution, followed by a sequence of mixing, settling, decanting, and filtering steps. Both of these general methods of producing a purified brine are relatively more expensive and require considerably more equipment, labor and attention than the method of this invention.

One modification of the present invention by which a sodium chloride brine having a low calcium, magnesium and sulfate impurity content may be produced comprises passing pretreated water, containing a precipitating reagent, through a bed of salt such as common rock salt or other grade of salt in which there has been incorporated another precipitating reagent. The depth of the salt bed through which the aqueous feed solution is passed is maintained at a predetermined height by a conventional feed hopper and associated control devices. The feed solution is sprayed or otherwise delivered onto the upper portion of the salt bed and is allowed to flow through the salt bed by gravity, the rate of flow of the feed solution through the salt bed and the depth of the salt bed being regulated so as to produce saturated brine before the solution enters the final section of the salt bed so that no more sodium chloride can be dissolved as the solution passes through this section. As a result the lower section of the salt bed serves as a filter medium for the saturated brine solution.

The feed water is pretreated with at least the stoichiometrical amount of caustic soda (NaOH) for completely reacting with all the soluble magnesium compounds in the feed water and also with the amounts of such compounds which would normally become dissolved in the brine during passage of the feed solution through the salt bed, to form corresponding insoluble magnesium precipitates. Prior to being fed into the salt bed, the salt has uniformly incorporated with it, in the dry form, at least the stoichiometrical amount of barium carbonate for completely reacting with all the soluble calcium and sulfate compounds in the feed water and also with the amounts of such compounds which normally would be removed from the salt during passage of the feed solution through the salt bed, to convert such calcium and sulfate compounds into insoluble precipitates.

The insoluble products formed by reaction of the precipitating reagents with the undesired calcium, magnesium and sulfate compounds in the feed solution and those which are removed from the salt during passage of the solution through the salt bed consist principally of magnesium hydroxide, calcium carbonate, and barium sulfate, but they may also include various other metallic hydroxides such as ferric hydroxide. The insoluble precipitates which result from the reaction of the caustic soda with the magnesium and other compounds in the feed water are temporarily held in suspension in the feed solution and are subsequently filtered out during passage of the solution through the salt bed. The insoluble products which result from reaction of the caustic soda and barium carbonate with the soluble magnesium, calcium and sulfate compounds leached out of the salt bed as the brine solution flows therethrough are immediately precipitated and are filtered out in the salt bed. The accumulated mass of precipitated compounds which is built up in the lower portion of the salt bed, and the lower portion of the salt bed itself from which no sodium chloride is dissolved, provide a highly effective filter medium for filtering the precipitated compounds out of the brine. As the effluent brine leaves the salt bed it is saturated, sparkling clear and has a very low undesirable impurity content. The acidity of the saturated brine solution may be modified, as desired, by the addition of a suitable acid, such as muriatic acid, through a pH controller.

At predeterminable intervals the salt bed is replaced with a fresh salt composition so as to prevent the mass of precipitated compounds from accumulating to an extent wherein inefficient or uneconomic conditions will result.

The caustic soda may be added to the feed water in a mixing tank from which the feed solution is drawn off and passed to the salt bed, but it is advantageously added in regulated amount to the feed water as the water flows to the salt bed, the turbulence of the flowing stream being utilized to mix the treating compound thoroughly into the water. In the latter event the caustic soda may be fed into the stream of feed water in the form of a concentrated solution, conventional metering devices being utilized to effect the desired regulated additions.

The barium carbonate may be added to and uniformly mixed with the salt before the salt is delivered to the hopper from which it is fed to the salt bed, or the barium carbonate may be added to and mixed with the salt as the salt flows from the feed hopper into the salt bed.

To assure the most effective removal of the undesired impurities, it is advisable to employ the precipitating reagents in amounts somewhat in excess of those indicated by the stoichiometrical requirements. Heretofore it has been the practice to utilize excess amounts of the precipitating reagents when purifying a brine solution by the mixing, settling, decanting, and filtering method referred to above, but one of the advantages of this invention is that it requires substantially less excess of caustic soda and yet requires no larger excess of barium carbonate than normally employed in the purification procedures heretofore used for producing sparkling clear brines having substantially equivalent contents of undesired impurities.

The reduced excess amount of the caustic soda required when utilizing the method of this invention may possibly be attributable to the fact that the magnesium, iron and other compounds which are removed from the salt never actually pass into solution because they are immediately reacted in situ with the precipitating reagent to produce the insoluble compounds. The intimate mixture of the barium carbonate with the salt in the salt bed also enables immediate conversion into insoluble precipitates of the calcium and sulfate compounds which are removed from the salt during passage of the solution through the salt bed.

The following table demonstrates the effectiveness of and degree of purification obtained by the method of this invention:

*Brine analysis table*

[All figures in grams per liter of saturated brine]

|  | Calcium (Ca) | Magnesium (Mg) | Sulfate (SO$_4$) | Caustic Soda (NaOH) |
|---|---|---|---|---|
| Feed Water | 0.0157 | 0.0010 | 0.0165 | nil |
| Brine A | 0.5688 | 0.0020 | 1.3699 | nil |
| Brine B | 0.0368 | nil | 0.1058 | 0.1440 |

Brine A was produced by the method described, except that neither the feed solution nor the salt in the salt bed had been pretreated with any precipitating reagents. Brine B was produced by the method described, using the same grade and brand of salt as used to produce brine A, but the feed water had been pretreated so as to contain 0.31 gram of caustic soda per liter (which is equivalent to 1.17 grams of caustic soda per gallon), and the salt of which the salt bed was composed had incorporated therewith dry precipitated barium carbonate to the extent of about 1.1% of the weight of the salt on the dry basis. Brines having purities similar to that of brine B are produced when using an excess of barium carbonate over the stoichiometrical requirements in the range of ten to fifteen per cent.

As indicated from the foregoing table the amount of caustic soda employed in the production and purification of brine B was about 0.1440 gram per liter of brine in excess of the stoichiometrical requirement. This excess amount of caustic soda is approximately one-half of the usual standard caustic soda excess of 0.3 gram per liter which is used to obtain similar brine purity with respect to magnesium in conventional purification systems where caustic soda is mixed with the saturated brine solution.

The stoichiometrical requirement of caustic soda to effect substantially complete removal of all soluble magnesium compounds which would normally be contained in the saturated brine can be calculated from an analysis of a brine produced by passing untreated feed water through the salt bed, or from available information as to the soluble magnesium impurity content of the feed water and salt.

The formation of insoluble precipitates by reaction of the caustic soda with undesirable impurities is not limited to removal in this manner of magnesium compounds, but is also effective in precipitating out of the solution various other metallic impurities such as ferric hydroxide.

The method of this invention may be applied equally well in revivifying partially spent brine. For example, the required predetermined amount of caustic soda may be added to a partially spent aqueous brine such as is used in canning processes and which may contain suspended foreign material as well as undesirable soluble impurities. This pretreated aqueous brine is then filtered down through a salt bed having incorporated therein and distributed therethrough a predetermined quantity of barium carbonate. As the brine solution passes through the salt bed it again becomes saturated, the suspended foreign materials are filtered out and the magnesium, calcium and sulfate impurities, with other precipitable impurities in the spent brine solution, as well as those removed from the salt during passage of the brine solution therethrough, are converted by the precipitating reagents into insoluble compounds which are filtered out in the salt bed, and particularly in the lower filter section thereof. The effluent brine is saturated and clarified and contains only very small quantities of magnesium, calcium and sulfate impurities.

Sodium chloride brines produced in accordance with this invention are sparkling clear physically and are as pure chemically with respect to their magnesium and calcium content as brines made from the highest grades of purified salt and the sulfate content is far lower than that of brines obtained from the highest grades of purified salt dissolved in distilled water. Although a specific example has been set out herein giving certain proportions of the precipitating reagents employed, and although the extent of the reduction in the excess amount of caustic soda required with the method of this invention over the excess amount of this reagent normally required where standard brine purification procedures using this reagent has been indicated, the invention is not limited to the proportions of ingredients indicated in either of these two manners.

I claim:

1. In a method for producing purified sodium chloride brine by passing an aqueous feed solution down through a bed of salt having a depth sufficient to saturate the solution with sodium chloride before the solution has passed completely through the salt bed, the improvement which comprises adding caustic soda to the feed solution and uniformly incorporating barium carbonate in the dry form with the salt in the salt bed prior to passing said solution into the salt bed, whereby the compounds in the feed solution and those removed from the salt during passage of the solution through the salt bed, and which are convertible to insoluble precipitates by reaction with caustic soda or barium carbonate are so converted to insoluble precipitates, and simultaneously filtering the brine solution through said salt bed to remove said insoluble precipitates from the brine.

2. In a method for producing purified sodium chloride brine by passing an aqueous feed solution down through a bed of salt having a depth sufficient to saturate the solution with sodium chloride before the solution has passed completely through the salt bed, the improvement which comprises adding caustic soda to the feed solution and uniformly incorporating barium carbonate in the dry form with the salt in the salt bed prior to passing said solution into the salt bed, whereby the compounds removed from the salt during passage of the solution through the salt bed and which are convertible to insoluble precipitates by reaction with caustic soda or barium carbonate are so converted to insoluble precipitates.

3. The process as defined in claim 2, in which said compounds are converted to insoluble precipitates in situ as the salt is being dissolved by said solution.

4. In a method for producing purified sodium chloride brine by passing an aqueous feed solution down through a bed of salt having a depth sufficient to saturate the solution with sodium chloride before the solution has passed completely through the salt bed, the improvement which comprises adding caustic soda to the feed solution and uniformly incorporating barium carbonate in the dry form with the salt in the salt bed prior to passing said solution into the salt bed, whereby the magnesium, calcium and sulfate compounds in the feed solution and those removed from the salt during passage of the solution through the salt bed are converted into insoluble precipitates, and simultaneously filtering the brine solution through said salt bed to remove said insoluble precipitates from the brine.

5. The process according to claim 4, in which said insoluble precipitates are removed from the brine solution by filtration of the brine solution through the lower undissolved portion of said salt bed.

6. The process according to claim 4, in which said insoluble precipitates are removed from the brine solution by filtration of the brine solution through a body of said precipitates which have been retained in the lower undissolved portion of said salt bed.

7. The process according to claim 4, in which the caustic soda and barium carbonate are respectively added to the feed solution and incorporated with the salt in amounts sufficient to provide an excess thereof over the stoichiometrical requirements for converting all of said magnesium, calcium and sulfate compounds into insoluble precipitates, said excess of caustic soda being approximately equivalent to 0.14 gram per liter of saturated brine.

8. The process according to claim 4, in which the caustic soda and barium carbonate are respectively added to the feed solution and incorporated with the salt in amounts sufficient to provide an excess thereof over the stoichiometrical requirements for converting all of said magnesium, calcium and sulfate compounds into insoluble precipitates, said excess of caustic soda being approximately equivalent to 0.14 gram per liter of saturated brine, and said excess of barium carbonate being in the range of ten to fifteen per cent.

9. The method of producing saturated sodium chloride brine containing relatively small quantities of magnesium, calcium and sulfate impurities, comprising the steps of pretreating an aqueous feed solution by mixing therewith a predetermined amount of caustic soda, passing such pretreated feed solution down through a salt bed containing barium carbonate uniformly incorporated therewith, said salt bed having a depth sufficient to saturate the solution with sodium chloride before the solution has passed completely through the salt bed, whereby the soluble magnesium, calcium and sulfate compounds removed from the salt during passage of the solution through the salt bed are substantially entirely converted by the caustic soda and barium carbonate into insoluble precipitates, and simultaneously filtering the brine solution through said salt bed to remove said insoluble precipitates from the brine.

10. The process as defined in claim 9, in which the amounts of caustic soda and barium carbonate employed are sufficient to convert to insoluble precipitates substantially the entire amount of the magnesium, calcium and sulfate compounds in the feed solution as well as those removed from the salt during passage of the solution through the salt bed.

DAVID W. HENGERER.

REFERENCES CITED

The following references are of record in the file of this patent:

UNITED STATES PATENTS

| Number | Name | Date |
|---|---|---|
| 299,774 | Garrigues | June 3, 1884 |
| 755,415 | Trantom | Mar. 22, 1904 |
| 1,520,920 | Yngve | Dec. 30, 1924 |
| 2,191,411 | Pierce | Feb. 20, 1940 |
| 2,412,106 | Swartz | Dec. 3, 1946 |